United States Patent Office 3,594,446
Patented July 20, 1971

3,594,446
HEAT-RESISTANT, LINEAR, AROMATIC COPOLYMERS AND PROCESS FOR THEIR PRODUCTION
Rudolf Gabler, Uitikon, and Josef Studinka, Zurich, Switzerland, assignors to Inventa A.G. fur Forschung und Patentverwertung, Zurich, Switzerland
No Drawing. Filed Feb. 26, 1969, Ser. No. 802,635
Claims priority, application Switzerland, Feb. 29, 1968, 3,005/68
Int. Cl. C08g 23/00, 33/00
U.S. Cl. 260—823   17 Claims

ABSTRACT OF THE DISCLOSURE

Heat-resistant, linear, aromatic copolymers containing thioether groups and ether groups as polymer forming connecting links, produced by reacting (a) 0.9–1.1 mole of a mixture of sodium or potassium salts of at least one aromatic dithiol and one aromatic diphenol of the formulae:

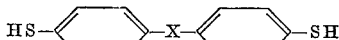
and
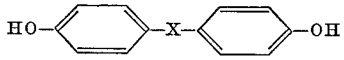

where X is —$CH_2$—;

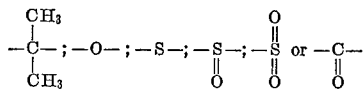

with (b) 1 mole of an aromatic dihalide of the formula

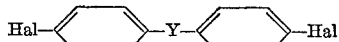

where Y is sulfonyl, disulfonyl, keto, diketo, azo, vinylene, alkyl phosphine or perfluoroethyl and Hal stands for halogen. The reaction is conducted at a high temperature, with oxygen excluded, in a strongly polar, aprotic solvent.

BACKGROUND OF THE INVENTION

Field of the invention

This invention relates to heat-resistant, linear, aromatic copolymers and a process for their production.

Description of the prior art

Polymers of purely linear structure in which the basic structural units are predominantly aromatic have acquired considerable industrial importance because of their durability at high continuous operating temperatures. Of special interest are those aromatic polymers which, although they possess a very high melting point, are nevertheless amenable to thermoplastic treatment on regular commercial machines. This class of linear thermoplastic polymers with predominantly aromatic structure includes especially certain polyphenyl ethers and polyphenyl thio ethers. Homopolymers of this kind are described, for example in U.S. Pat. 2,538,941, British Pat. 962,941, French Pat. 1,475,273, French Pat. 1,361,068 and French Pat. 1,516,583.

SUMMARY OF THE INVENTION

It has been found that valuable linear aromatic copolymers can be produced, which are heat-resistant and resistant to polar solvents, by reacting (a) 0.9–1.1 mole of a mixture of alkali salts from at least one aromatic dithiol and one aromatic diphenol of Formulae I and II:

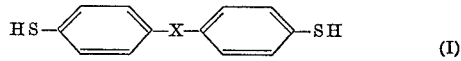
and
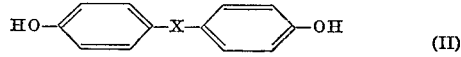

where X stands for a bivalent connecting link selected from the group consisting of

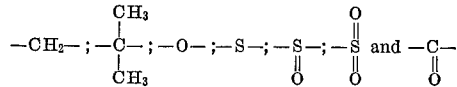

at high temperature, in the absence of oxygen, in a strongly polar, aprotic solvent, with (b) 1 mol of an aromatic dihalide of Formula III

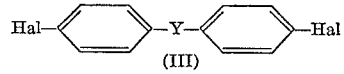

where Y stands for a strongly electron-attracting group and Hal stands for a halogen.

DESCRIPTION OF PREFERRED EMBODIMENTS

The alkali salts in question are mainly salts of sodium and potassium.

The term "strongly electron-attracting," in conformity with Hammett's definition (L. P. Hammett, Phys. Org. Chem., New York 1940, p. 184) refers to connecting links possessing a σ-constant of at least +0.5. The halogen atoms in para position (F, Cl, Br or I) are sufficiently activated by such negative substituents that they react easily and quantitatively with the alkali salts of diphenols and dithiols. Y, for example, may stand for the sulfonyl group

the disulfonyl group

the keto group

the diketo group

the azo group —N=N—, a vinylene group, an alkyl phosphine oxide group

(where the alkyl contains preferably up to 4 C-atoms) and the perfluoroethyl group —$CF_2$—$CF_2$—. The sulfonyl and keto groups are preferred.

Sufficiently polar, aprotic solvents for the copolycondensation of the invention, and in which the copolymer produced is soluble, and which do not react with the starting materials, include especially dimethyl sulfoxide, and also dimethyl acetamide, dimethyl formamide, sulfolane (tetrahydrothiophene dioxide) and N-methyl pyrrolidone. Mixtures of these solvents can also be used. It is an advantage if the starting materials, i.e. the alkali salts of diphenols and dithiols and of the dihalogen compounds are also at least partly soluble in the solvents employed. It is also possible to add to the strongly polar solvents such diluents as e.g. chlorobenzene or nitrobenzene, which would not by themselves suffice to carry out the polycondensation in the desired sense.

The reaction temperatures depend on the reactivity of the initial components and on the stability of the solvents. In general they lie between 50 and 250° C. It is an advantage to work with temperatures between 100–140° C., since all the mentioned solvents are sufficiently stable within this range, and most of the starting monomers show sufficient reactivity. Only in special cases is it necessary to operate in N-methylpyrrolidone at 200–210° C.

The following starting materials, for example, are suitable for the manufacture of the copolymers of the invention.

(A) DITHIOLS (Compound of Formula I):

4,4'-disulfhydryl diphenyl methane
2,2-bis-(4,4'-disulfhydryl diphenyl)-propane
4,4'-disulfhydryl diphenyl ether
4,4'-disulfhydryl diphenyl sulfide
4,4'-disulfhydryl diphenyl sulfoxide
4,4'-disulfhydryl diphenyl sulfone (B) DIPHENOLS (Compound of Formula II):

4,4'-dioxy diphenyl methane
2,2-bis-(4,4'-dioxydiphenyl)-propane
4,4'-dioxy diphenyl ether
4,4'-dioxy diphenyl sulfide
4,4'-dioxy diphenyl sulfoxide
4,4'-dioxy diphenyl sulfone (C) DIHALOGEN COMPOUNDS (Compound of Formula III):

4,4'-dichlorodiphenyl sulfone
4,4'-dibromo diphenyl sulfone
4,4'-dichloro diphenyl disulfone
4,4'-difluoro benzophenone
4,4'-dichloro-diphenyl-P-ethyl phosphine oxide
4,4'-dichloro-diphenyl tetrafluoro ethane The preferred dithiols are the 4,4'-disulfhydryl diphenyl ether and 4,4'-disulfhydryl diphenyl sulfide, the preferred diphenols 2,2 - bis-(4,4'-dioxydiphenyl)-propane and 4,4'-dioxy diphenyl methane, and the preferred dihalogen compounds, 4,4'-dichloro diphenyl sulfone and 4,4'-dichloro benzophenone.

0.1 to 0.9 mole of 4,4'-disulfhydryl diphenyl ether and 0.9 to 0.1 mole 2,2-bis-(4,4'-dioxy diphenyl)-propane can be advantageously converted with the equivalent quantity of 4,4-dichloro diphenyl sulfone.

In preparing the copolymers, the mixing ratio of diphenol to dithiol can be varied arbitrarily. Since the reaction of the halogen compound (III) is quantitative both with the dithiol (I) and the diphenol (II), these two monomers can be totally incorporated in the copolymer in the presence of alkali, splitting off alkali halide. However, since the dithiols or their alkali salts react much more rapidly than the diphenols with the activated dihalogen compounds, alternating, block or statistical copolymers can be formed, depending on the reaction conditions.

Denoting the structural unit of the homopolythio-ether as A and that of the homopoly-ether as B, the three types of copolymer are formed according to the following schemes:

Statistical copolymer: ABBABAAABBABABBB......
Alternating copolymer: ABABABABABAB.........
Block copolymer: AAAAAAAABBBBBBBBBAAAAAA......

If all three starting monomers, i.e. diphenol, dithiol and activated dihalogen compound, are mixed together and the poly-condensation is carried out with this mixture, then owing to the $10^2$–$10^4$ times greater reaction rate of the dithiols, alternating copolymer will preferably be formed This is assuming that the dithiol and diphenol are added in equal molar parts.

Table 1 shows some properties of such an alternating copolymer, formed from 50 mol percent each of polyether and polythio/ether structural units, compared with the corresponding homopolymers. The copolymer in this case contains 50 mol percent each of 4,4'-disulfhydryl diphenyl ether and 2,2-bis-(4,4'-dioxydiphenyl)-propane available under the trademark "Bisphenol A," and 100 mol percent 4,4'-dichlorodiphenyl sulfone.

TABLE 1

| Mole percent: | | | |
|---|---|---|---|
| Dithiol | 100 | 50 | 0 |
| Diphenol | 0 | 50 | 100 |
| Properties: | | | |
| (1) Melting point ° C.,[1] | 240–260 | 235–250 | 230–245 |
| (2) Water absorption percent.[2] | 0.82 | 0.81 | 0.80 |
| (3) Thermogravimetric weight loss percent,[3] | 27.5 | 29.5 | 52.4 |
| Increase of weight from swelling in (percent)—[4] | | | |
| (4) Acetone | 15.3 | 17.4 | >100 |
| (5) Diethyl ether | 2.4 | 4.4 | 13.5 |
| (6) Ethyl acetate | 16.1 | 25 | >100 |

[1] M.P. range determined under hot-stage microscope.
[2] Saturation in boiling water on 0.5 mm. thick foils.
[3] Total loss after heating in contact with air two hours at each of the following temperatures 200°, 250°, 300°, 350°, 400°, and 450° C.
[4] According to DIN 53476.

Table 1 shows that the melting point of the copolymer lies between those of the homopolymers, as one would expect from an isomorphic copolymer system. The same applies e.g. to the water absorption, which is the same for the two homopolymers and thus does not change in the copolymer.

The surprising exceptions to this rule are the thermal stability of the copolymers of the invention and their behaviour relative to polar solvents, as indicated by lines 3–6 of Table 1.

The thermal stability is determined by the loss of weight on heating a specimen for a total of 10 hours to temperatures between 200 and 450° C. The fact that the phenyl ether homopolymer loses almost twice as much weight as the phenyl thio ether homopolymer shows the superior thermal stability of the latter. Surprisingly, however, the loss of weight of the copolymer is not the arithmetic means between the two homopolymers, but rather the lower value of the polythio ether is retained almost unchanged. This fact is of considerable industrial importance, because it thus becomes possible to manufacture co-polyether-thioethers with excellent thermal stability, in which a considerable part of the comparatively expensive dithiol is replaced by the less costly diphenol, or in other words: the thermal stability of an aromatic polyether can be greatly improved by adding 5–99 mol percent, preferably 20–60 mol percent of an aromatic polythioether.

The behaviour of the copolymers of the invention with respect to polar solvents was also unexpected. The swelling behaviour was investigated according to DIN specification No. 53476 on 50 x 20 x 0.5 mm. strips of film at 23° C. The specimens were placed in the solvent, e.g. acetone, ethyl acetate and diethyl ether, and the weight increase after 7 days was determined.

Comparison of lines 4 and 6 of Table 1 shows that the homopolythio ether in these solvents swells very much less than the homopolyether. Surprisingly the copolymer with a content of 50% of each of the two homopolymers shows swelling values only slightly above that of the homopolythioether, whereas one would expect them to be close to the arithmetic mean.

Other copolymers in which the swelling behaviour in polar solvents and the thermal stability are determined largely, up to high contents of the diphenol component, by the thioether component, are polycondensates of:

| Diphenol/dithiol (20–60 mol percent) (dithiol content) | Halogen compound |
|---|---|
| Bisphenol A: 4,4'-disulfhydryl diphenylsulfide, 4,4'-dioxydiphenyl methane, 4,4'-disulfhydryl diphenyl ether | 4,4'-dichloro diphenyl sulfone. |
| 4,4'-dioxydiphenyl sulfide, 4,4'-disulfhydryl diphenyl methane | Do. 4,4'-dichloro benzophenone. |
| Bisphenol A: 4,4'-disulfhydryl diphenyl ether | 4,4'-dichlorobenzil. |
| 4,4'-dioxy diphenyl sulfone, 4,4'-disulfhydryl diphenyl sulfone | 4,4'-dichloroazobenzene. |
| 4,4'-dioxy diphenyl sulfoxide, 2,2-bis-(4,4'-disulfhydryl diphenyl propane. | 4,4'-dibromostilbene. |

Block copolymers which contain the aromatic ether and thioether groups as polymerising connecting links are obtained as follows:

A dithiol of Formula I and a diphenol of Formula II are first condensed in separate vessels with a dihalogen compound of Formula III until a certain degree of polymerization is reached. The two polymerisates are then combined and the condensation is completed. It can easily be shown that the resulting polymers are genuine block copolymers, not mixtures of polymers, by the fact that neither of the two homopolymers can be extracted with selective solvents from the washed and dried product.

The block copolymers from aromatic polyethers and polythioethers are also distinguished by unexpected properties differing from those of the homopolymers as well as those of the statistical and alternating copolymers. This applies particularly to the tensile strength at comparatively high temperature, as shown by Table 2.

TABLE 2
[Tensile strength at 150° C. of homopolymers and statistical, alternating and block copolymers from 4,4'-disulfhydryl diphenyl ether, "Bisphenol A" and 4,4'-dichloro diphenyl sulfone]

| Type of polymer | Mixture ratio, mol percent | RSV [1] | Schematic structure | Tensile strength at 150° C.,[2] kg./cm.[2] |
|---|---|---|---|---|
| Homopolyether | 100 | 0.50 | BBBB | 100 |
| Homopolythioether | 100 | 0.38 | AAAA | 230 |
| Statistical copolymer | 50/50 | 0.48 | ABAABABB | 187 |
| Alternating copolymer | 50/50 | 0.52 | ABABAB | 205 |
| Block copolymer | 50/50 | 0.55 | AAABBB | 300 |

[1] Reduced specific viscosity measured in chloroform (0.2 g. in 100 ml.) at 20° C.
[2] Measured on 0.5 mm. thick foils molded at 260–270° C.

As Table 2 shows, the block copolymer has the highest tensile strength, a value not attained by either of the homopolymers. The strength values for the statistical and alternating copolymers lie between those of the homopolymers.

Unlike the block and alternating copolymers, the statistical copolymers show no unexpected properties. Statistical copolymers can be produced by adding the solution in a suitable solvent, e.g. dimethyl sulfoxide, of a sodium salt of a dithiol and that of a diphenol drop by drop over a period of 2–8 hours to the activated dihalogen compound dissolved in the same solvent and heated to a reaction temperature of 140–160° C.

In preparing the copolymers of this invention preferably 1 mole dihalogen compound is used with 1 mole of the dithioldiphenyl compound mixture. Exact equivalence gives the highest molecular weights. However, very high molecular weights are undesirable, on account of the high melt viscosities associated with them, which render the thermoplastic processing of the copolymers difficult or even impossible.

Since exact molecular weights cannot at present be stated for the copolymers of the invention, we use the reduced specific viscosity (RSV) to characterize the average chain length, given by $$RSV = \frac{\eta_{rel}-1}{C}$$

where $\eta_{rel}$ is the relative viscosity and $C$ is the concentration of the polymer in g. per 100 ml. solvent. Chloroform or N-methyl pyrrolidone is used as the solvent.

It has been found that RSV-values of 0.3–0.8 are desirable in the copolymers of the invention in order to get favorable results with respect to the thermoplastic processing. For processing from the solution copolymers with RSV values greater than 0.8 are suitable.

In order to adjust the molecular weight or RSV to the desired low value a slight excess of 0.1–1 mole percent of the dihalogen compound is preferably used. However, the molecular weight can also be restricted by using 0.1–1 mole percent of a chain-terminating compound, e.g. 4-chlorodiphenyl sulfone, benzyl chloride, benzyl bromide, p-xylylene dichloride, ethyl bromide, etc. Generally speaking the starting monomers are sufficiently reactive so that it is unnecssary to use special catalysts. If it is desired to reduce the reaction time, e.g. in a continuous polycondensation process, salts of copper or iodine may be used, e.g. copper (I) chloride, copper (II) chloride, copper acetate, cupric iodide, potassium iodide or sodium iodide, as reaction accelerators.

In order to brighten the usually rather yellowish copolymers, colour improving additives, e.g. sodium phosphite, phosphorus acid, triphenyl phosphite, or suitable optical bleaches can be added before, during or after polycondensation. Finally, colored copolymers can be produced by adding pigments or soluble or dispersive dyes to the reaction batches.

Th copolymers of the invention can be shaped from the melt or solution into numerous articles, e.g. foils, slabs, tubes, rods, profiles and injection-molded articles of every kind. These products are distinguished by their great heat stability particularly by their ability to withstand continuous temperatures of 120–180° C. Moreover, they possess excellent electrical insulating characteristics, low water absorption, high dimensional stability and strength in the presence of heat, and chemical stability in the presence of dilute acids, alkalis of any concentration and most organic solvents with the exception of chlorinated hydrocarbons.

The following examples illustrate the invention in greater detail:

EXAMPLE 1

(Alternating copolymer)

6849 g. Bisphenol A (0.03 mole) and 70.302 g. 4,4'-disulfhydryl diphenyl ether (0.03 mole) are weighed out and placed in a 250 ml. three-necked flask fitted with a stirrer, a Dean Stark trap and a gas-inlet tube. 13.33 ml. aqueous sodium hydroxide (360 mg. NaOH/ml., 0.12 mole) is added under nitrogen, then 70 ml. xylene. The mixture is heated to a boil while feeding in nitrogen. The water distills off as an azeotrope with the xylene and is quantitatively separated in three hours. The disodium salt of Bisphenol A or of 4,4'-disulfhydryl diphenyl ether is present in the form of a white crystalline powder suspended in xylene. After distilling off the xylene, 17.229 g. 4,4'-dichloro diphenyl sulfone (0.06 mole) and 46 ml. anhydrous dimethyl sulfoxide are added. The reaction mixture is then heated to 145–150° C. in an oil bath. The homogeneous solution first turns orange then lightens perceptibly, while at the same time the viscosity increases. After a reaction time of three hours a very viscous, yellowish polymer solution is obtained. The polymer is precipitated in water, pulverized and extracted thoroughly with water. The white granular product is then dried in a high vacuum at 140° C. The reduced specific viscosity of the polymer is 0.66 (in chloroform, 0.2 g./100 ml. solvent).

The M.P. range of the polyether-thioether copolymer is 235–250° C., measured on a hot-stage microscope.

The copolymer can be pressed at 240° C. into transparent sheets which show high mechanical strength.

EXAMPLE 2

The procedure is similar to that in Example 1, except that 10.274 g. Bisphenol A (0.045 mole) and 3.5151 g. 4,4'-disulfhydryl diphenyl ether (0.015 mole) are used. The ratio of bisphenol to dithiol in this case is 3:1.

The course of the reaction and the appearance of the copolymer do not differ from the case described above. The reduced specific viscosity is 0.56 (in chloroform, 0.2 g./100 ml. solvent). The M.P. range is 232–248° C. Moulded sheets show similar properties to those of the copolymer in Example 1.

EXAMPLE 3

(Alternating copolymer)

The same reaction conditions and the same apparatus are used as in Example 1. 6.5471 g. 4,4'-dihydroxy diphenyl sulfide (0.03 mole) and 6.9708 g. 4,4'-disulfhydryl diphenyl methane (0.03 mole) are converted to the corresponding sodium salt and then subjected in the usual way to polycondensation with 15.0666 g. 4,4'-dichlorobenzophenone (0.06 mole). After three hours there is no further increase in the viscosity of the reaction mixture. The product is worked up in the manner described in Example 1. The reduced specific viscosity is 0.61 (0.2 g./100 ml. chloroform). The somewhat yellowish, granular product has an M.P. range of 240–265° C. It can be moulded into very flexible, transparent sheets.

EXAMPLE 4

(Statistical copolymer)

17.229 g. 4,4'-dichloro diphenyl sulfone (0.06 mole) is dissolved in 20 ml. anhydrous dimethyl sulfoxide under a nitrogen current at 155° C. in a 250 ml. three-necked flask fitted with stirrer, thermometer, gas-input tube and dropping funnel. The solutions of 8.3493 g. sodium salt of 4,4'-disulfhydryl diphenyl ether (0.03 mole) and 8.1681 g. sodium salt of Bisphenol A (0.03 mole) both in 20 ml. dimethyl sulfoxide, are poured into the dropping funnel. The solution is then allowed to drip for two hours into the dichloro diphenyl sulfone already present, with continuous stirring and passage of nitrogen. After all the solution has dripped through, stirring is continued another hour at 160° C. The product is worked up in the manner described in Example 1.

The reduced specific viscosity of this statistical copolymer is 0.45 (in chloroform, 0.2 g./100 ml. solvent).

EXAMPLE 5

(Block copolymer)

For the preparation of a block copolymer two flasks like the one described in Example 1 are required. 11.717 g. 4,4'-disulfhydryl diphenyl ether (0.05 mole) are converted in the first one with 11.05 ml. aqueous NaOH (362 mg. NaOH/ml., 0.1 mole) by azeotropic distillation with xylene to the anhydrous disodium salt. Similarly, 11.414 g. Bisphenol A (0.05 mole) are converted in the second flask to the corresponding alkali salt. After distilling off the xylene, 14.358 g. 4,4'-dichlorodiphenyl sulfone (0.05 mole) and 46 ml. dimethyl sulfoxide are added to both flasks. In flask 1 polycondensation starts at 90° C., in flask 2 at 150° C. When these initial condensates visibly thicken, after about 10 minutes, they are brought together in flask 2, where they are stirred for an additional 2 hours at 160° C. The viscosity increases continuously. At the end we have an extremely viscous, almost colourless solution. Samples taken from the individual preparations before combining show reduced specific viscosities of 0.22 (flask 1) and 0.17 (flask 2) respectively, measured in chloroform (0.2 g./ml. solvent). The reduced specific viscosity of the final block copolymer is 0.55.

The product is again worked up in the manner of Example 1. The M.P. range of the white granular product is 240–255° C. At 270° C. it is possible to mould very transparent, almost colorless films which show a tensile strength of 300 kg./cm.² at 150° C.

What is claimed is:

1. A process for preparing heat-resistant, linear aromatic copolymers which comprises reacting (a) 0.9–1.1 mole of a mixture of the alkali salts of an effective amount of at least one aromatic dithiol and an effective amount of at least one aromatic diphenol of the Formulae I and II.

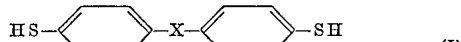

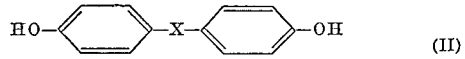

where X is a bivalent connecting link selected from the group consisting of —CH₂—;

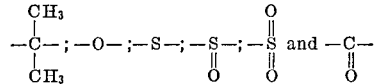

with (b) 1 mole of an aromatic dihalogen compound of Formula III

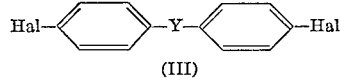

where Y is a strongly electron-attractive group and Hal stands for halogen, the reaction being conducted at elevated temperature, with oxygen excluded, in a strongly polar, aprotic solvent.

2. A process according to claim 1 wherein said temperature is from about 50° to about 250° C.

3. A process according to claim 1 wherein Y is selected from the group consisting of sulfonyl, disulfonyl, keto, diketo, azo, vinylene, lower alkyl phosphine oxide and perfluoroethyl.

4. A process according to claim 3 wherein Hal is a member selected from the group consisting of chlorine, bromine and fluorine.

5. A process according to claim 4 wherein the polar, aprotic solvent is selected from the group consisting of dimethyl sulfoxide, dimethyl acetamide, dimethyl formamide, sulfolane and N-methyl pyrrolidone.

6. A process according to claim 2, wherein 4,4'-disulfhydryl diphenyl ether is used as the dithiol of Formula I, 2,2-bis-(4,4'-dioxy diphenyl)-propane as the diphenol of Formula II and 4,4'-dichlorodiphenylsulfone as the dihalogen compound.

7. A process according to claim 6 wherein 0.1–0.9 moles 4,4'-disulfhydryl diphenyl ether and 0.9–0.1 moles 2,2-bis-(4,4'-dioxydiphenyl)-propane are reacted with the equivalent amount of 4,4'-dichloro diphenyl sulfone.

8. A process according to claim 2 wherein 4,4'-disulfhydryl diphenyl sulfide is used as the dithiol, 4,4'-dioxy diphenyl methane as the diphenol and 4,4'-dichloro benzophenone as the dihalogen compound.

9. A process according to claim 2 for preparing a statistical copolymer, wherein the mixture of dithiol and diphenol is added drop by drop over a period of 2–8 hours at high temperature to the dihalogen compound.

10. A process according to claim 2 for preparation of an alternating copolymer, wherein 50 mol percent each of dithiol and diphenol are condensed with 100 mol percent dihalogen compound.

11. A process according to claim 10 wherein 1 mole 4,4'-dichloro diphenyl sulfone is reacted with 0.5 mole 2,2-bis-(4,4'-dioxy diphenyl)-propane and 0.5 mol 4,4'-disulfhydryl diphenyl ether.

12. A process according to claim 2 for preparation of a block copolymer, wherein the dithiol and diphenol are first condensed separately, each with the equivalent amount of the dihalogen compound, up to an intermediate degree of polymerization, and are thereafter condensed fully together.

13. A process according to claim 2 wherein a dihalogen compound of Formula III is used in which Y signifies a strongly electron-attracting group, the σ-value of which (Hammett definition) ≧0.5.

14. A process according to claim 13 wherein Y represents the sulfonyl group

15. A process according to claim 13 characterized in that Y represents the keto group

16. A process according to claim 2 wherein dimethyl sulfoxide is used as a strongly polar, aprotic solvent.

17. A copolymer which is the reaction product of (a) 0.9–1.1 mole of a mixture of the alkali salts of an effective amount of at least one aromatic dithiol and an effective amount of at least one aromatic diphenol of the Formulae I and II

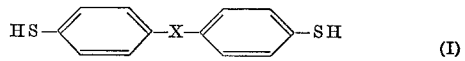

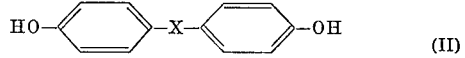

where X is a bivalent connecting link selected from the group consisting of —CH₂—;

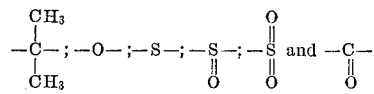

with (b) 1 mole of an aromatic dihalogen compound of Formula III

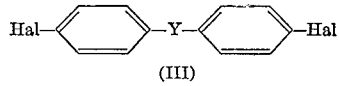

where Y is a strongly electron-attractive group and Hal stands for halogen, the reaction being conducted at elevated temperature, with oxygen excluded, in a strongly polar, aprotic solvent.

References Cited

UNITED STATES PATENTS

| 3,332,909 | 7/1967 | Farnham et al. | 260—47 |
|---|---|---|---|
| 3,432,468 | 3/1969 | Gabler | 260—47 |
| 3,446,654 | 5/1969 | Barth et al. | 260—47 |

SAMUEL H. BLECH, Primary Examiner

U.S. Cl. X.R.

260—31.2R, 31.2T, 32.8R, 33.2R, 37R, 47R, 49